US011856023B2

(12) United States Patent
Kacewicz et al.

(10) Patent No.: US 11,856,023 B2
(45) Date of Patent: Dec. 26, 2023

(54) IDENTIFICATION OF INVALID ADVERTISING TRAFFIC

(71) Applicant: IronNet Cybersecurity, Inc., McLean, VA (US)

(72) Inventors: Ania Kacewicz, Baltimore, MD (US); Matthew C. Swort, Port Deposit, MD (US)

(73) Assignee: IronNet Cybersecurity, Inc., McLean, VA (US)

( * ) Notice: Subject to any disclaimer, the term of this patent is extended or adjusted under 35 U.S.C. 154(b) by 362 days.

(21) Appl. No.: 17/330,313

(22) Filed: May 25, 2021

(65) Prior Publication Data

US 2022/0385692 A1 Dec. 1, 2022

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01); *H04L 63/20* (2013.01)

(58) Field of Classification Search
USPC .......................................................... 726/26
See application file for complete search history.

(56) References Cited

U.S. PATENT DOCUMENTS

| | | | |
|---|---|---|---|
| 7,376,969 B1 | 5/2008 | Njemanze | |
| 9,306,965 B1* | 4/2016 | Grossman | H04L 63/1425 |
| 9,910,993 B2 | 3/2018 | Grossman | |
| 11,477,223 B2* | 10/2022 | Lowney | H04L 63/1425 |
| 2004/0205612 A1* | 10/2004 | King | G06F 40/117 |
| | | | 715/248 |
| 2009/0164269 A1 | 6/2009 | Gupta | |
| 2011/0231249 A1 | 9/2011 | Zuili | |
| 2015/0178771 A1 | 6/2015 | Linden | |
| 2015/0215330 A1* | 7/2015 | Katz | H04L 63/0407 |
| | | | 726/22 |
| 2016/0112443 A1 | 4/2016 | Grossman | |
| 2021/0092161 A1* | 3/2021 | Crabtree | G06F 21/6218 |

OTHER PUBLICATIONS

Pastor et al; "Nameles: An Intelligent System for Real-Time Filtering of Invalid Ad Traffic"; The World Wide Web Conference 2019; May 13, 2019; Retrieved on Sep. 5, 2022 from https://dl.acm.org/doi/abs/10.1145/3308558.3313601; 11 pages.

PCT; International Search Report and Written Opinion for PCT/US2022/030579 issued by the International Searching Authority dated Oct. 6, 2022.

Wikipedia; "Traffic analysis"; https://en.wikipedia.org/w/index.php?title=Traffic_analysis&oldid=1007961218; Feb. 20, 2021; downloaded Mar. 18, 2021; 6 pages.

* cited by examiner

*Primary Examiner* — Sakinah White Taylor
(74) *Attorney, Agent, or Firm* — Fitch, Even, Tabin & Flannery LLP

(57) ABSTRACT

Systems and techniques for detecting advertising fraudulent traffic, or invalid traffic, by correlating advertising traffic with cyber network defense events are described. For example, described techniques include querying cyber network traffic events, querying the metadata returned by the tag script placed in the displayed advertisement, and correlating times, internet protocol (IP) addresses, publisher domains, and referrer domains with domains and IP addresses flagged by network cyber security events.

38 Claims, 6 Drawing Sheets

IDENTIFICATION OF INVALID ADVERTISING TRAFFIC

BACKGROUND OF THE INVENTION

1. Field of the Invention

The present invention relates generally to cybersecurity, and more specifically to processing events to identify invalid ad traffic.

2. Discussion of the Related Art

Various systems and processes are known in the art for processing events to identify invalid ad traffic.

In cybersecurity, traffic analysis may include intercepting and examining messages in order to deduce information from patterns in communication (e.g., which may be performed even when the messages are encrypted). In general, the greater the number of messages observed, or even intercepted and stored, the more can be inferred from the traffic. Traffic analysis can be performed in the context of military intelligence, counter-intelligence, pattern-of-life analysis, etc., and is a concern in computer security. Traffic analysis tasks may be supported by dedicated computer software programs. Advanced traffic analysis techniques may include various forms of social network analysis.

Invalid traffic (IVT) is defined as any activity that does not come from a real authentic user with genuine interest. IVT can include accidental clicks caused by intrusive advertising implementations, fraudulent clicking by competing advertisers, and advertising, among other examples.

In some examples, IVT may be discovered through the analysis of the traffic interacting with the advertisements (ads) on a publisher site. It is difficult to prove which traffic was valid (e.g., as it is not feasible to ask a user whether they meant to load or click on an advertisement). Further, it is difficult to detect coordinated or campaign behaviors solely through analyzing advertising traffic. Accordingly, improved techniques and cybersecurity systems for identifying and accessing traffic validity may be desired.

SUMMARY

Techniques described herein provide a method for detecting invalid traffic (IVT) through correlation of advertising metadata with network defense cyber events and alerts. For example, suspicious network traffic events (e.g., potential IVT) may be identified by leveraging generated cyber events and alerts which are indicative of IVT and their associated Domain Name System (DNS) domains and Internet Protocol (IP) addresses. In some examples, a time bounded subset of advertising metadata may be extracted. Cyber events and alerts indicative of fraudulent activity may also be extracted within a specified time bound. Accordingly, in near real time, the domains and/or IP addresses present in the cyber events and alerts may be temporally correlated with the publisher websites, referrer websites, and/or client IP addresses interacting with the advertisements on the publisher websites.

An apparatus, system, and method for processing events to identify invalid ad traffic are described. One or more embodiments of the apparatus, system, and method include a plurality of rendering devices configured to collect event data in response to network traffic events, generate network event metadata as a function of the event data, and transmit the network event metadata. One or more embodiments of the apparatus, system, and method further include a distributed analytic platform configured to receive the cyber-event metadata from a plurality of sensors, process the cyber-event metadata using analytics to detect unwanted cyber activity, generate analytic outputs as a function of detected unwanted cyber activity, and transmit the analytic outputs and associated behavioral metadata. One or more embodiments of the apparatus, system, and method further include an analytic engine configured to receive the network event metadata from the plurality of rendering devices, receive the analytic outputs from the distributed analytic platform, correlate the network event metadata and the analytic outputs, and identify at least one of the network traffic events as suspicious in response to the network event metadata and the analytic outputs having been correlated.

An apparatus, system, and method for processing events to identify invalid ad traffic are described. One or more embodiments of the apparatus, system, and method include a plurality of detectors, each detector of the plurality of detectors being configured to receive detector data from a network, process the detector data to form network events, and transmit the network events. One or more embodiments of the apparatus, system, and method further include a distributed analytic platform configured to receive cyber events from a plurality of sensors and process the cyber events to form analytic workflows and distributed analytic platform messages. One or more embodiments of the apparatus, system, and method further include a scoring engine configured to receive the analytic workflows from the distributed analytic platform, receive the cyber events from at least one of the plurality of sensors, process the cyber events using the analytic workflows to produce scoring engine messages, and transmit the scoring engine messages. One or more embodiments of the apparatus, system, and method further include a real time analytic engine configured to receive the analytic workflows from the distributed analytic platform, receive analytic workflow and event processing rules, correlate the network events and the scoring engine messages; and identify at least one of the network events as suspicious in response to the network events and the scoring engine messages having been correlated.

DETAILED DESCRIPTION

Figure 1:
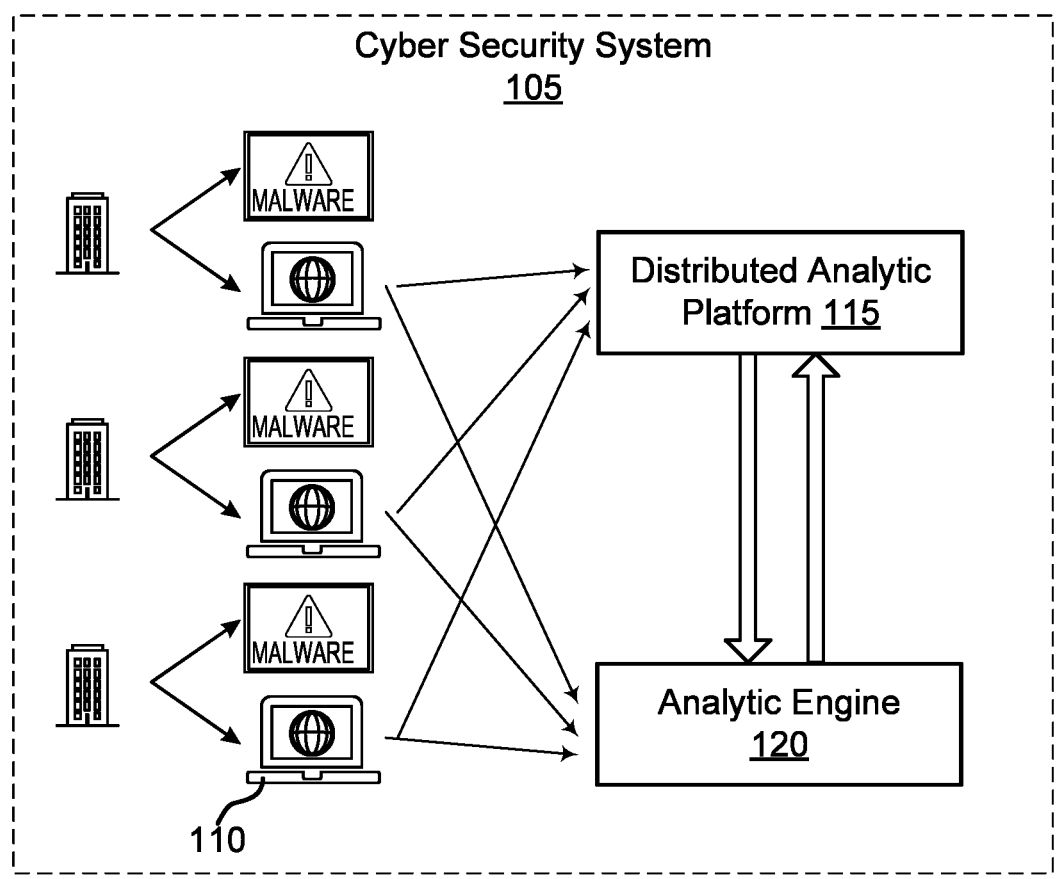
FIG. 1 shows an example of a cybersecurity network diagram according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In cybersecurity, traffic analysis may include intercepting and examining messages in order to deduce information from patterns in communication (e.g., which may be performed even when the messages are encrypted). Traffic analysis method can be used to break the anonymity of anonymous networks. Generally, traffic-analysis attacks may be considered in two approaches, passive and active. In passive traffic analysis methods, the attacker extracts features from the traffic of a specific flow on one side of the network and looks for those features on the other side of the network. In active traffic analysis methods, the attacker alters the timings of the packets of a flow according to a specific pattern and looks for that pattern on the other side of the network (e.g., therefore, the attacker can link the flows in one side to the other side of the network and break the anonymity of it). Although timing noise is added to the packets, there are active traffic analysis methods robust against such a noise.

In Advertising Fraud, the majority of invalid traffic is discovered through the analysis of traffic interacting with advertisements (ads) on a webpage. For traffic interacting with webpage advertisements, it may be difficult to determine which traffic was actually invalid, as it may not be feasible to ask the user whether they meant to click on an advertisement (e.g., it may not be feasible to confirm the validity of all advertisement interactions with each legitimate user). Further, it may be difficult to detect coordinated or campaign behaviors solely through analyzing webpage advertisement traffic. In some cases, invalid traffic may be detected through pixel metadata. However, traffic analysis through pixel metadata may lack originating point visibility as well as ground truth on the validity of the traffic.

Accordingly, the techniques described herein address these challenges by correlating advertising traffic in real time (e.g., or near real time) with cyber network defense events and alerts. Such may provide user behavior visibility to the advertising traffic. Invalid traffic associated with advertisements may be more effectively determined by bolstering pixel ad metadata with malicious behaviors seen from the originating source.

FIG. 1 shows an example of a cybersecurity network diagram according to aspects of the present disclosure. In one embodiment, cyber security network 100 includes cyber security system 105. In one embodiment, cyber security system 105 includes rendering devices 110, distributed analytic platform 115, and analytic engine 120.

Invalid Traffic (IVT) may be defined as any activity that does not come from a real user with genuine interest. In the context of advertisements, IVT may be defined as any advertisement traffic (e.g., any advertisement interaction) that does not come from the actual end user, or that was unintentional interaction from the end user. For example, IVT can include accidental clicks caused by intrusive advertising implementations, fraudulent clicking by competing advertisers, advertising botnets, etc.

In some examples, IVT may be discovered through the analysis of traffic interacting with the advertisements on a publisher site. It may be difficult to determine and prove which traffic is valid and invalid, as it may not be feasible to ask the user whether they meant to load or click on each advertisement. Further, it may be difficult to detect coordinated or campaign behaviors solely through analyzing advertising traffic.

The techniques described herein provide a method for detecting IVT, in real time, through correlation of advertising metadata with network defense cyber events and alerts. In some aspects, the described techniques leverage generated cyber events and alerts which are indicative of IVT and their associated Domain Name System (DNS) domains and Internet Protocol (IP) addresses. In some examples, a time bounded subset of advertising metadata may be extracted. Cyber events and alerts indicative of fraudulent activity may also be extracted within a specified time bound. Accordingly, in near real time, the domains and/or IP addresses present in the cyber events and alerts may be temporally correlated with the publisher websites, referrer websites, and/or client IP addresses interacting with the advertisements on the publisher websites.

According to some embodiments, cyber security network 100 comprises a set of cybersecurity systems. In some examples, each cybersecurity system of the set of the cybersecurity systems is configured to exchange a selected threat intelligence message with one or more of the other cybersecurity systems. In some examples, the selected threat intelligence message is encrypted to provide a secure mechanism for transferring information, where the information in the selected threat intelligence message does not expose sensitive internal information about the transmitting cybersecurity system.

According to some embodiments, rendering devices 110 are configured to collect event data in response to network traffic events, generate network event metadata as a function of the event data, and transmit the network event metadata.

According to some embodiments, distributed analytic platform 115 is configured to receive the cyber-event metadata from a plurality of sensors, process the cyber-event metadata using analytics to detect unwanted cyber activity, generate analytic outputs as a function of detected unwanted cyber activity, and transmit the analytic outputs and associated behavioral metadata. In some examples, the distributed analytic platform 115 is configured to receive the cyber-events from the set of sensors, process the cyber events to form analytic workflows and distributed analytic platform 115 messages, and transmit the analytic workflows and the distributed analytic platform 115 messages.

In some examples, each of the distributed analytic platform 115 messages is associated with at least one of an alert, an update to a first analytic model, and cyber behavioral information, and where each of the analytic workflows is associated with one or more logical segments and includes at least one analytic model. In some examples, the distributed analytic platform 115 is further configured to receive the scoring engine messages and process the scoring engine messages to form threat intelligence messages. In some examples, each of the one or more logical segments is associated with at least one of a division of the network, a division of the traffic on the network, a division of users on the network, a division of devices on the network, a division based upon third party data, and data associated with at least one of the divisions of the network, the traffic on the network, the users on the network, the devices on the network and third party data. In some examples, at least a first division overlaps with at least a second division.

According to some embodiments, distributed analytic platform 115 is configured to receive cyber events from a plurality of sensors and process the cyber events to form analytic workflows and distributed analytic platform 115 messages. In some examples, each of the distributed analytic platform 115 messages is associated with at least one of an alert, an update to a first analytic model, and cyber behavioral information. In some examples, each of the analytic workflows is associated with one or more logical segments and includes at least one analytic model. In some examples, each of the one or more logical segments associates at least one of the first analytic model, the second analytic model, a third analytic model, a set of analytic models, and the analytic workflow, one or more sources of inputs about activity within the logical segment, and a set of actions for mitigating an impact of anomalous activity occurring within the logical segment.

Distributed analytic platform 115 is an example of, or includes aspects of, the corresponding element described with reference to FIG. 5.

According to some embodiments, analytic engine 120 is configured to receive the network event metadata from the plurality of rendering devices 110, and receive the analytic outputs from the distributed analytic platform 115. According to some embodiments, analytic engine 120 is configured to correlate the network event metadata and the analytic outputs, and identify at least one of the network traffic events as suspicious in response to the network event metadata and the analytic outputs having been correlated.

Analytic engine 120 is an example of, or includes aspects of, the corresponding element described with reference to FIGS. 2 and 4.

Figure 2:
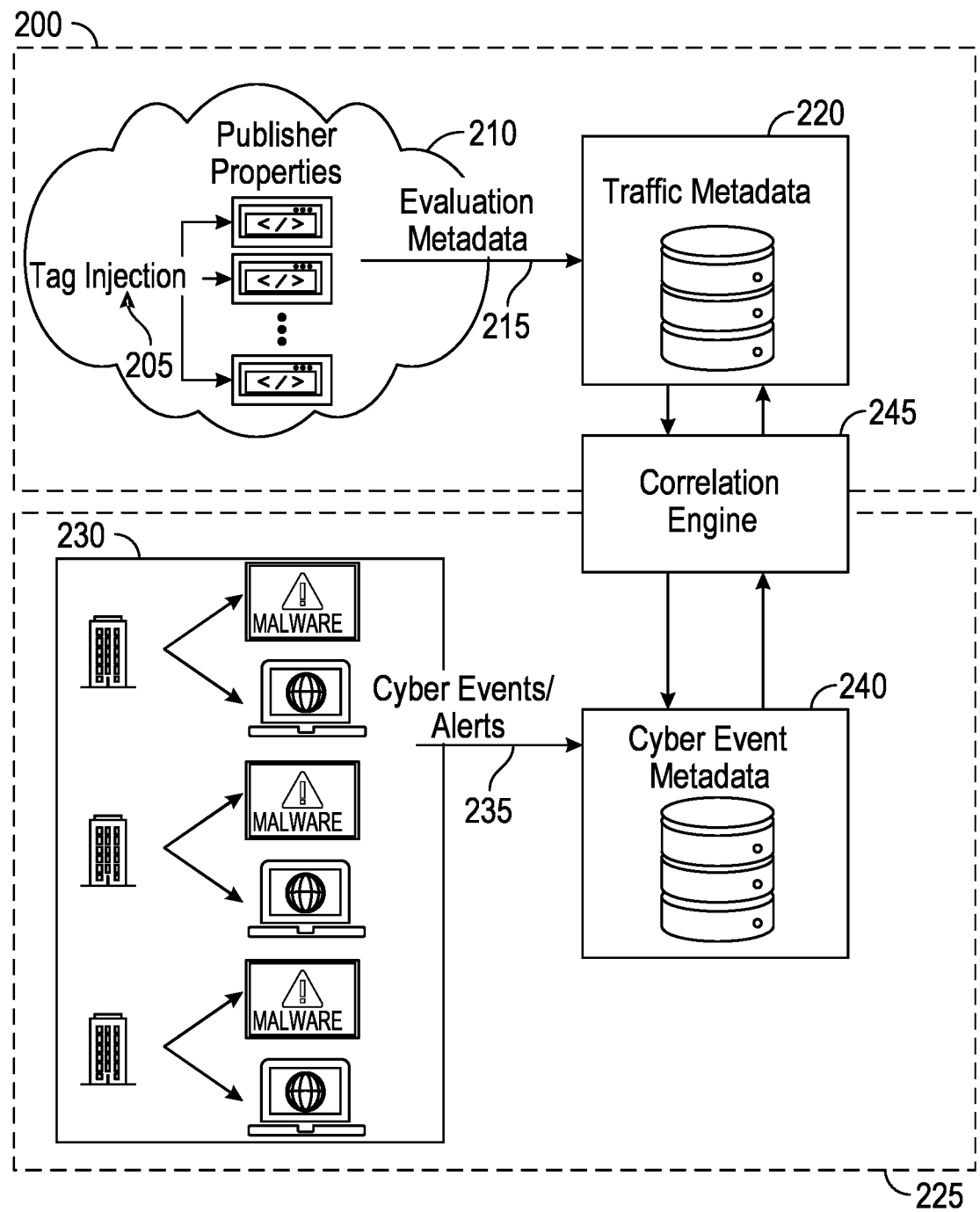
FIG. 2 shows an example of an example cybersecurity network according to aspects of the present disclosure.

FIG. 2 shows an example of an example cybersecurity network according to aspects of the present disclosure. The example shown includes ad monitoring deployment 200, Network Traffic Analysis Detection and Response (NTA/NDR) deployment 225, and correlation engine 245. In one embodiment, ad monitoring deployment 200 includes script tag 205, publisher property 210, cyber-event metadata 215, and traffic metadata database 220. In one embodiment, NTA/NDR deployment 225 includes client NTA/NDR deployment 230, network traffic events 235, and cyber event metadata database 240. Client NTA/NDR deployment 230 is an example of, or includes aspects of, the corresponding element described with reference to FIG. 4. Correlation engine 245 is an example of, or includes aspects of, the corresponding element (e.g., an analytic engine) described with reference to FIGS. 1 and 4.

Among other examples, traffic analysis may pose concerns in computer security. An attacker may gain important information by monitoring the frequency and timing of network packets. For instance, a timing attack on secure shell (SSH) protocol can use timing information to deduce information about passwords since, during interactive session, SSH transmits each keystroke as a message. The time between keystroke messages can be analyzed using, for example, hidden Markov models (e.g., which may recover passwords up to fifty times faster than a brute force attack, in some cases).

Onion routing systems may be used to gain anonymity. Traffic analysis can be used to attack anonymous communication systems (e.g., such as a Tor anonymity network). In some cases, traffic-analysis may enable adversaries to infer which nodes relay anonymous streams, which thus reduces the anonymity provided by anonymity networks. For example, in some instances, otherwise unrelated streams can be linked back to the same initiator.

Remailer systems may also be attacked via traffic analysis. If a message is observed going to a remailing server, and an identical-length (if now anonymized) message is seen exiting the server soon after, a traffic analyst may be able to (automatically) connect the sender with the ultimate receiver. Variations of remailer operations exist that can make traffic analysis less effective.

IVT may be characterized by fraudulent traffic which may generated in the context of advertisement interactions in order to produce unwarranted revenue. In some examples, IVT is generated using malware, adware, botnets, etc. Cyber events and alerts produced by a NTA/NDR capability enables visibility into the network behaviors coming from client machines from customer-owned network environments. The utilized NTA/NDR capability possesses a set of behavioral analytics which detect common vectors of attacks ranging over the cyber kill chain (e.g., as identified by frameworks such as available globally-accessible knowledge base of adversary tactics and techniques based on real-world observations). These analytics can detect malware, adware, phishing attempts, data exfiltration, etc. The NTA/NDR analytics generate events and alerts which are aggregated over multiple clients using a cyber collective defense strategy. These events and alerts are given ratings by cyber analysts providing ground truth to whether the behavior was suspicious, malicious, or benign. Techniques described herein may correlate the events and alerts found within collective defense with the advertising metadata collected from a client through a publisher.

Ad monitoring deployment 200 may include an advertisement containing script tag served on a publisher property 210. The collected tag metadata may be returned and stored in traffic metadata database 220. FIG. 2 may display a holistic NTA/NDR deployment 225 including individual client NTA/NDR deployments 230. Behavioral events/alerts (e.g., network traffic events 235) may be aggregated from each of the NTA/NDR deployments 225, which are then stored in cyber event metadata database 240. The correlation of the cyber events/alerts with the advertising metadata is shown being performed via correlation engine 245 (e.g., in some cases, correlation engine 245 may include, or be referred to as, an analytic engine, a real time analytic engine, etc.). This process allows for the detection of invalid traffic using both advertisement pixel metadata and network traffic analytic events.

A database (e.g., traffic metadata database 220, cyber event metadata database 240) is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

Figure 3:
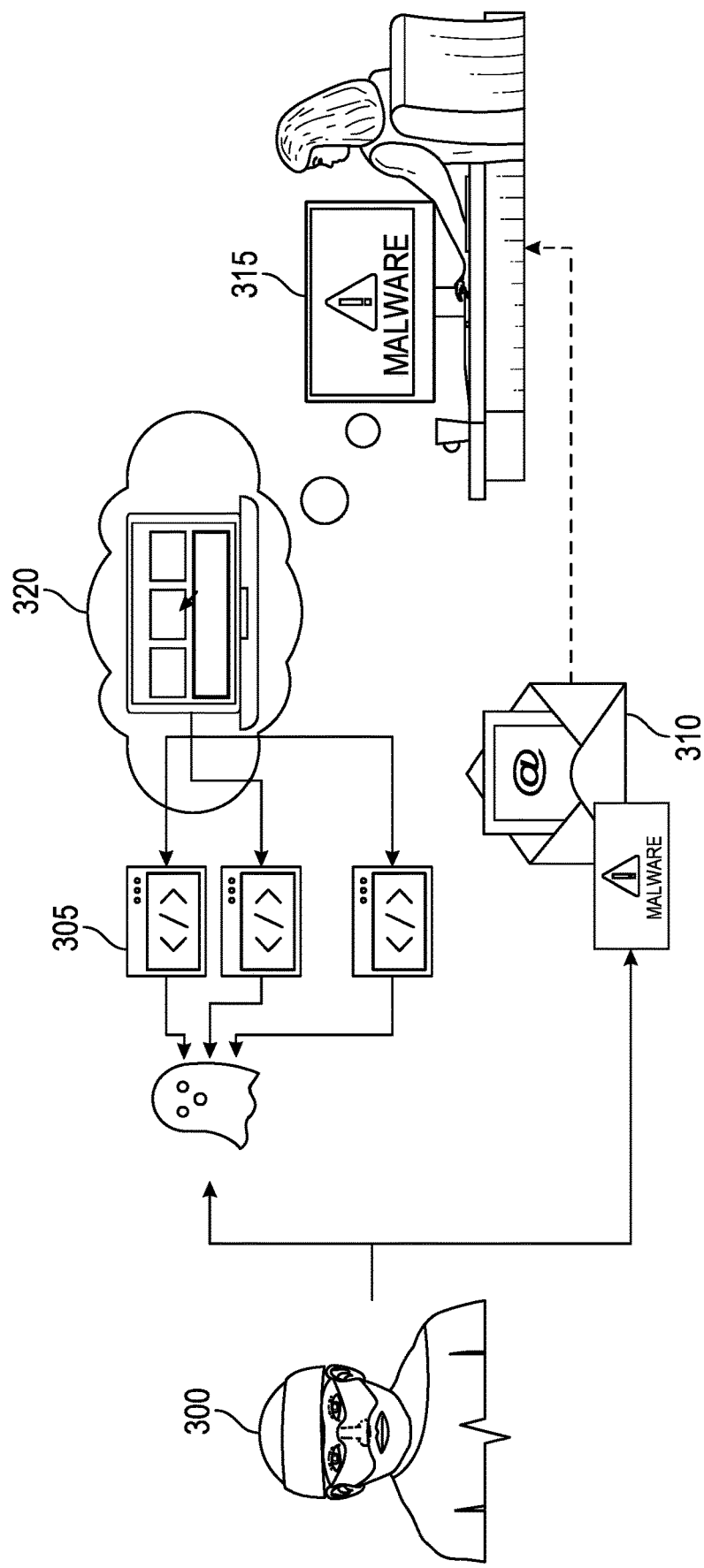
FIG. 3 shows an example of an example cyber-attack diagram according to aspects of the present disclosure.

FIG. 3 shows an example of an example cyber attack diagram according to aspects of the present disclosure. The example shown includes ad fraud adversary 300, malicious websites 305, malware 310, user 315, and fraudulent browser 320. For example, FIG. 3 shows a pictorial view of a sophisticated ad fraud adversary 300. The ad fraud adversary 300 may register and deploy malicious websites 305. The ad fraud adversary 300 may propagate the malware 310 to the user 315 (e.g., through an email attachment, drive by download, etc.), and user 315 may unknowingly download the malware 310. In some examples, the malware 310 may spin up a fraudulent browser 320 (e.g., an invisible browser) to generate fraudulent ad click revenue (e.g., by going to the registered domains of the malicious websites 305).

Conventional IVT analytics have visibility of the clicks from the fraudulent browser 320 to the malicious websites 305. However, the techniques described herein may have visibility of malicious websites 305, malware 310, user 315 (e.g., user 315 traffic), and fraudulent browser 320. The techniques described herein may detect malware 310 downloaded by phishing attack, as well as detect the malware 310 reaching out to command to control center to receive action instructions. Further, the described techniques may detect the malware 310 spinning up an invisible browser (e.g., fraudulent browser 320) and reaching out to the compromised websites (e.g., malicious websites 305).

Figure 4:
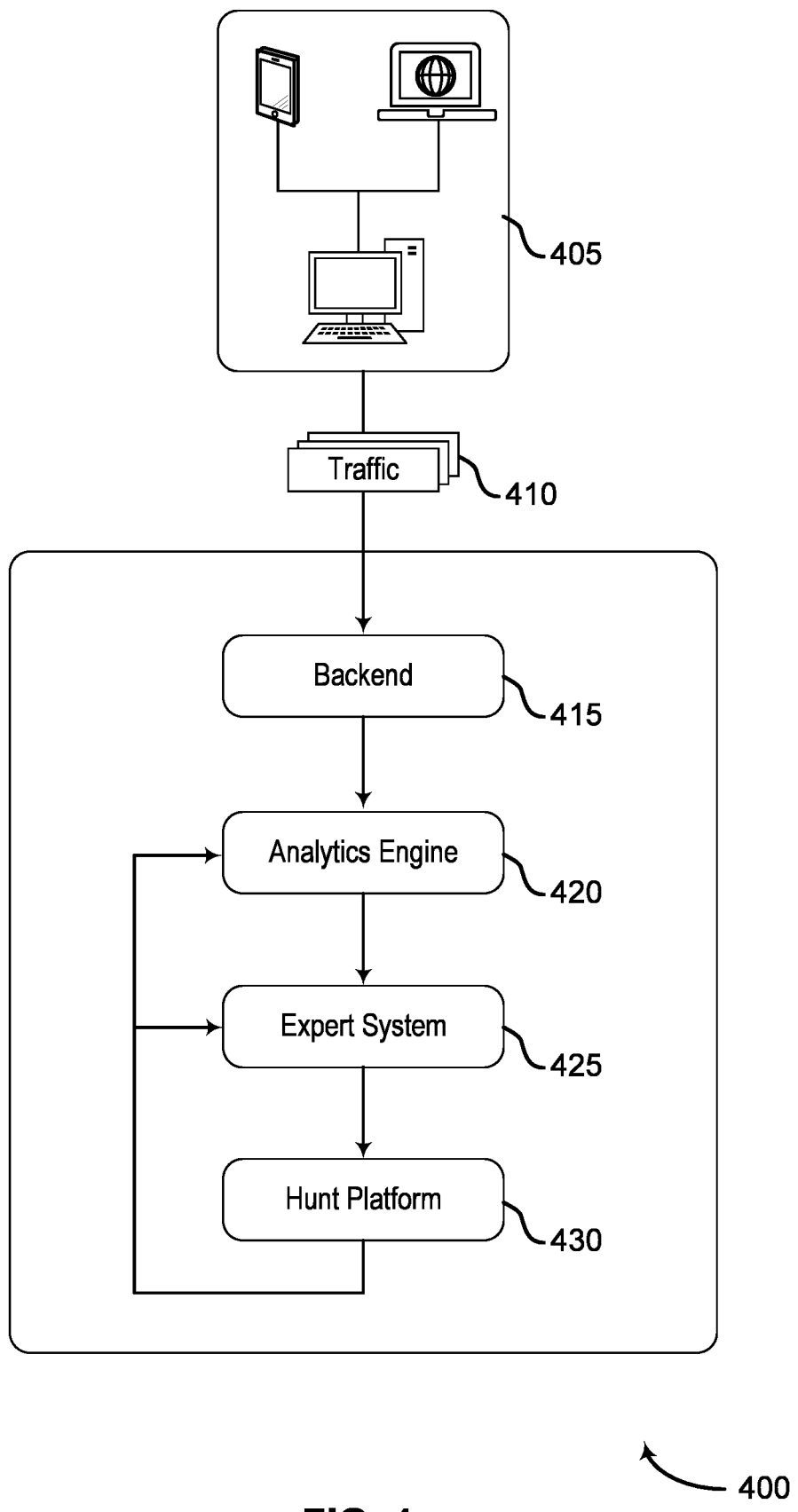
FIG. 4 shows an example of an example client Network Traffic Analysis Detection and Response (NTA/NDR) deployment according to aspects of the present disclosure.

FIG. 4 shows an example of an example client NTA/NDR deployment 400 according to aspects of the present disclosure. For example, FIG. 4 depicts an example client NTA/NDR deployment 400 as described herein (e.g., with reference to FIG. 2) in detail. Specifically, FIG. 4 shows an individual client NTA/NDR deployment 400. Traffic 410 may be monitored on an endpoint via endpoint traffic monitor 405. The traffic 410 may be parsed and stored in the backend 415. The traffic 410 metadata may then be run against a collection of behavioral cyber security analytics generated to detect suspicious cyber activity. Analytic events may be passed through expert system 425 platform, which scores and prioritizes events. The scored events are then passed to a hunt platform 430, where the hunters label the events as benign, suspicious, malicious, etc. The hunter labeled feedback may then be fed back into the analytics engine and expert system 425 to retrain the models.

Client NTA/NDR deployment 400 is an example of, or includes aspects of, the corresponding element described with reference to FIG. 2. In one embodiment, client NTA/NDR deployment 400 includes endpoint traffic monitor 405, traffic 410, backend 415, analytic engine 420, expert system 425, and hunt platform 430. Analytic engine 420 is an example of, or includes aspects of, the corresponding element described with reference to FIGS. 1 and 2.

Figure 5:
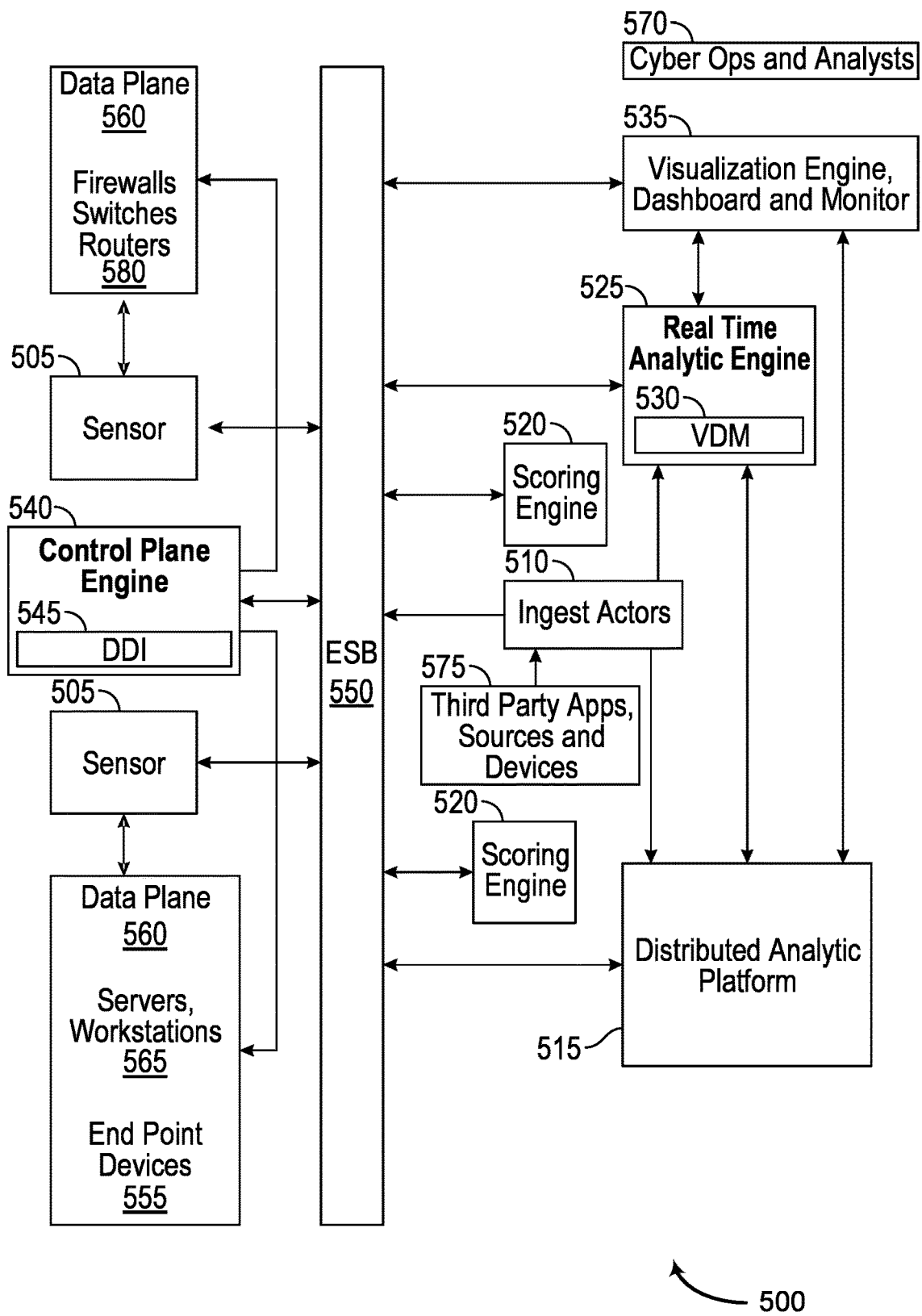
FIG. 5 shows an example of a cybersecurity framework according to aspects of the present disclosure.

FIG. 5 shows an example of a cybersecurity framework 500 according to aspects of the present disclosure. The example of FIG. 5 illustrates a system diagram showing a cybersecurity framework 500, according to some embodiments of the present disclosure. FIG. 5 shows sensor 505 (also referred to herein as cyber sensor), ingest actors module 510, distributed analytic platform 515, scoring engine 520, real time analytic engine 525, visualization engine 535, control plane engine 540, and bus 550 (e.g., distributed enterprise service bus 550 (ESB)). In some embodiments of the present disclosure, sensor and scoring engine 520 are combined into a single integrated application. FIG. 5 also shows additional system components, including end point devices 555, data plane 560, servers and workstations 565, cyber operations (ops) staff and cyber analysts 570, third party applications, sources, and devices (e.g., devices 575), and switches, routers, and firewalls 580.

Sensors 505 capture and process data from the enterprise data plane 560 and pass the data to bus 550, where the data is routed for further processing. Data plane 560 transmits data to and from the various devices 575 on the enterprise network including from end point devices 555, servers and workstations 565, and firewalls 580, switches, and routers. Control plane engine 540 receives processed data from bus 550 and monitors, configures and reconfigures network devices 575 (e.g., including switches, routers, and firewalls 580).

Scoring engine 520 receives data from bus 550 and, for each event in the stream, processes the event using one or more analytic models to produce outputs, including scores, alerts and messages, as well as related information. Ingest actors module 510 may capture and process data from third party applications, sources, and devices (e.g., devices 575), and send the data to bus 550 (e.g., where the data is routed for further processing).

Distributed analytic platform 515 (which can also be referred to as an analytic cloud) is a distributed computing platform that can be used for analyzing large amounts of data and producing various analytic results. Distributed analytic platform 515 receives and sends data to and from bus 550, ingest actors module 510, real time analytic engine 525, and visualization engine 535.

Real time analytic engine 525 receives data from bus 550 and the distributed analytic platform 515 and performs near real time computations using distributed memory and specialized processors, such as GPUs, creates near real time visualizations, and creates near real time decisions about mitigation actions by processing data from multiple scoring engines 520 and other sources.

Visualization engine, dashboard and monitor (e.g., Visualization engine 535) receives and sends data to and from bus 550, real time analytic engine 525, and analytic platform. Visualization engine 535 provides cyber ops and analysts 570 a visual representation of the other elements described in FIG. 5. Visualization engine 535 can provide user configurable dashboards, provide real time information and support for real time queries from real time analytic engine 525, provide and visualize the results of analysis using the distributed analytic platform 515, and provide interactive ability to query for entities, alerts, events, PCAP data, flow data, graphs, etc.

In some embodiments, sensors 505 (also referred to herein as cyber sensors 505) are positioned on the enterprise data plane 560. Sensors 505 collect and process network data on the enterprise data plane 560. In some embodiments, cyber sensor can be connected directly to scoring engine 520 (e.g., without being connected through a bus 550) or integrated with the scoring engine 520.

In some embodiments of the present disclosure, the out of band system network uses a distributed bus 550 (e.g., a distributed enterprise service bus 550 (ESB)) for communication. A distributed bus 550 is language and platform agnostic and can include any enterprise service bus 550 including, but not limited to AMQP, NSQ, ZeroMQ, RabitMQ, Adeptia ESB Suite, IBM WebSphere 5 ESB, Microsoft BizTalk Server, and Oracle Enterprise Service Bus 550. A bus 550 delivers messages reliably and, in most embodiments, has a very high throughput. Generally, an enterprise service bus 550 monitors, routes and resolves communication from a variety of devices 575. Devices 575 can include end point devices 555 and data plane 560. End point devices 555 include end point devices 555, such as workstation servers, personal computers and mobile devices 575 such as cell phones and tablets. The data plane 560 includes devices 575 that carry network traffic such as firewalls 580, switches, and routers. In addition, control plane traffic to firewall 580, switches, routers and other devices 575 that are part of the control plane is also passed to the out of band system network.

In some embodiments, messages on bus 550 are usually divided into separate streams, often called topics, each with their own queues, so that the messages related to one topic do not interfere with messages related to another topic. The present disclosure in exemplary implementation uses topics to create separate queues in the bus 550 so that different types of events processed by the scoring engines 520, messages passed to different system components, different types of TIMs, etc. all have different queues.

Data may be passed to the out of band system network for processing, analysis, and visualization in two ways: via sensors 505 and via ingest actors module 510. Sensors 505 and ingest actors module 510 are discussed in more detail herein. The processing and analysis of data results in the creation of further records and (threat intelligence messages) TIMs, which are passed to the out of band ESB bus 550, and the creation of real time visualizations and various reports.

One way that data enters the system is via sensors 505. Sensors 505 capture and process data from the enterprise data plane 560. Network taps, which are part of the sensor, are inserted at key points for network visibility and mirroring of network traffic to support real-time processes. Briefly, sensor processes packets and builds records and flows associated with the processed packets.

A second way that data enters the system is via ingest actors module 510. Ingest actors module 510 can be designed to process data from third party applications (apps), sources and devices 575. Third party applications (apps), sources and devices 575 can include other system components; log files produced by workstations 565, servers, network devices, and other computing devices 575 on the enterprise networks; information streams produced by other security applications, including host based security systems; external third party sources of data, including information about threats, reputations of IPs, response policy zone (RPZ) information and related information; other systems with the same architecture, either at other geographically distributed locations of the same enterprise, or associated with other enterprises; and other systems with a different architecture but following an agreed upon format for exchanging information.

Ingest actors module 510 receive input data to process from one of the sources described above or directly from the bus 550. After processing, ingest actors module 510 delivers the processed event back to the bus 550 for additional processing by other system components. Ingest actors module 510 receives input data to process from third party applications (apps), sources and devices 575, and performs data processing and the conversions required so that input data can be transmitted to the bus 550, real time analytic engine 525 or distributed analytic platform 515 for further processing. In some embodiments, processing at ingest actors module 510 involves taking input data and converting the input data into a format suitable of ingestion by bus 550, real time analytic engine 525, or distributed analytic platform 515.

A scoring engine 520 is a module that can import an analytic model (or an analytic workflow) and takes data from the network and from other system modules. Once an analytic model is imported, a scoring engine 520 can read a stream of data and for each event in the stream, process the event using one or more analytic models, to produce outputs, including scores, alerts and messages, as well as related information. Scoring engine 520 is a module that can score data with statistical and behavioral models at network speeds. Models can be built offline from historical data or from streaming data. In some embodiments, scoring engine 520 can emit scoring engine messages, such as alerts, containing metadata data and scores. In some embodiments, scoring engine 520 is PF A-compliant, as described in more detail below. Scoring engine 520 can score data using statistical, predictive, and data mining models such as a cluster model, baseline model, Bayesian network or a regression and classification tree. Models can be built offline based on historical data. Models can also be streaming analytic models, as discussed in more detail below.

Distributed analytic platform 515 or analytic cloud is a distributed computing platform that can be used for analyzing large amounts of data and producing various analytic results. Distributed analytic platform 515 can hold large amounts of data for analysis, both using a distributed file system, such as Hadoop or MapR, or using a non-relational (e.g., NoSQL) database, such as HBase, Accumulo, MapR-DB, etc. In some embodiments of the present disclosure, the distributed analytic platform 515 is a distributed computing platform that includes support for MapReduce and iterative MapReduce computations, such as those supported by Spark. The distributed analytic platform 515 in some embodiments of the present disclosure, also includes support for performing iterative computations with data either on disk, in memory, or both on disk and in memory, as well as support for NoSQL databases and other specialized applications and tools for working with distributed data in a system such as Hadoop, MapR, Spark, or other distributed computing platform. Distributed analytic platform 515 also includes a REST-based API so that the various system components can access data and information in the distributed analytic platform 515 in a uniform way, independent of the particular analytic, process or component within the distributed analytic platform 515 that produced the data or information.

The distributed analytic platform 515 receives data from sensors 505 and ingest actors module 510 via the distributed bus 550. In some embodiments of the present disclosure, the distributed analytic platform 515 also receives data directly from ingest actors module 510.

There are several types of outputs from the distributed analytic platform 515, including: threat intelligence messages (TIMs) that are sent to the bus 550, and from the bus 550 to the control plane engine 540; data and data structures describing visualizations of the data that are sent to the real time analytic engine 525 (as described in more detail below), and from the real time analytic engine 525 to the visualization engine 535; analytic workflows, including analytic models, described in portable format for analytics (PFA) (as described in more detail below), as well as other languages that can be used for describing analytic models for scoring engine 520.

Real time analytic engine 525 receives data from bus 550 and the distributed analytic platform 515 and performs several functions, including performing near real time computations of derived, aggregated, and transformed data using distributed memory and specialized processors, such as GPUs; creating near real time visualizations of network activity, behavior of enterprise entities, users, and flows, potential threats, correlated behaviors, etc.; and creating near real time decisions about mitigation actions by processing data from multiple scoring engines 520 and other sources.

In one embodiment, cybersecurity framework 500 includes sensors 505, ingest actors module 510, distributed analytic platform 515, scoring engine 520, real time analytic engine 525, visualization engine 535, control plane engine 540, bus 550, end point devices 555, data plane 560, workstations 565, analysts 570, devices 575, and firewall 580.

According to some embodiments, sensor 505 of the plurality of sensors 505 is coupled to at least one of the plurality of rendering devices 575, and wherein each sensor 505 of the plurality of sensors 505 is configured to detect cyber events and generate the cyber-event metadata in response to the cyber events. In some examples, each sensor 505 of the set of sensors 505 is coupled to the distributed analytic platform 515 via a network and is configured to receive sensor data from at least one of the set of rendering devices 575, process the sensor data to form the cyber-event metadata, and transmit the cyber-event metadata to the distributed analytic platform 515, and where the distributed analytic platform 515 is configured to receive the cyber-event metadata via the set of sensors 505.

In some examples, the set of sensors 505, the set of scoring engines 520, the distributed analytic platform 515, the real time analytic engine 525, and a control plane engine 540 are connected using an out of band network. In some examples, the set of sensors 505, the set of scoring engines 520, the distributed analytic platform 515, the real time analytic engine 525, and the control plane engine 540 communicate by sending associated messages over an enterprise system bus 550. In some examples, the set of sensors 505, the set of scoring engines 520, the distributed analytic platform 515, the real time analytic engine 525, and the control plane engine 540 communicate by sending associated messages over the enterprise system bus 550.

In some examples, the set of sensors 505, the set of scoring engines 520, the distributed analytic platform 515, the real time analytic engine 525, a control plane engine 540, and the ingest actors module 510 are connected using an out of band network. In some examples, the set of sensors 505, the set of scoring engines 520, the distributed analytic platform 515, the real time analytic engine 525, a control plane engine 540, and the ingest actors module 510 communicate by sending associated messages over an enterprise system bus 550. In some examples, one or more sensors 505 of the set of sensors 505 and the set of scoring engines 520 are integrated into a single application. In some examples, the set of sensors 505, the set of scoring engines 520, the distributed analytic platform 515, the real time analytic engine 525, a control plane engine 540, and the ingest actors module 510 communicate by sending associated messages over an enterprise system bus 550.

According to some embodiments, ingest actors module 510 is configured to receive third party application data from at least one of a third party application and a third party device and transmit the third party application data for further processing by at least one of the plurality of scoring engines 520, the distributed analytic platform 515 and the real time analytic engine 525.

Distributed analytic platform 515 is an example of, or includes aspects of, the corresponding element described with reference to FIG. 1.

According to some embodiments, real time analytic engine 525 is configured to receive the analytic workflows from the distributed analytic platform 515, receive analytic workflow and event processing rules, receive the scoring engine messages from the plurality of scoring engines 520, receive the distributed analytic platform messages from the distributed analytic platform 515, and process the scoring engine messages and the distributed analytic platform messages using the analytic workflows from the distributed analytic platform 515 and the analytic workflow and event processing rules. In some examples, each of the one or more logical segments associates at least one of the first analytic model, the second analytic model, a third analytic model, a set of analytic models, and the analytic workflow; one or more sources of inputs about activity within the one or more logical segments; and a set of actions for mitigating an impact of anomalous activity occurring within the one or more logical segments.

In some examples, to form at least one of a broadcast message, the mitigation message, and the model update message, the real time analytic engine 525 is further configured to receive a first output at a first time from at least one of the set of scoring engines 520, the distributed analytic platform 515, and the set of sensors 505. The real time analytic engine 525 is further configured to retrieve first state information corresponding to the first output, and update the first state information with first output data. The real time analytic engine 525 is further configured to process the updated first state information by the analytic workflow associated with the real time analytic engine 525 to form processed updated first state information. The real time analytic engine 525 is further configured to store the processed updated first state information in the real time analytic engine 525 and receive a second output at a second time from at least one of the set of scoring engines 520, the distributed analytic platform 515, and the set of sensors 505.

The real time analytic engine 525 is further configured to retrieve second state information corresponding to the second output and update the second state information with second output data; process the updated second state information by the analytic workflow associated with the real time analytic engine 525 to form processed updated second state information. The real time analytic engine 525 is further configured to form the at least one of the broadcast message, the mitigation message and the model update message based on the processed updated second state information, and store the processed updated second state information in the real time analytic engine 525.

In some examples, the real time analytic engine 525 is further configured to receive an interim output at a third time from at least one of the set of scoring engines 520, the distributed analytic platform 515, and the set of sensors 505, where the third time is subsequent to the first time and prior to the second time. The real time analytic engine 525 is further configured to retrieve interim state information corresponding to the interim output, update the interim state information with interim output data, and process the updated interim state information by the analytic workflow associated with the real time analytic engine 525 to form processed updated interim state information. The real time analytic engine 525 is further configured to store the processed updated interim state information in the real time analytic engine 525.

In some examples, the analytic workflows include a Model Interchange Format document that supports a composition of analytic models; a segmentation of analytic models; an ensemble of analytic models; a composition of analytic models with rules; a composition of analytic models with pre-processing and post-processing stages, where the pre-processing and post-processing stages includes data transformations and data aggregations; and the analytic workflows, each of the analytic workflows further including compositions of at least one of the analytic models, the rules, the data transformations, the data aggregations, the segmentations, and ensembles.

In some examples, the real time analytic engine 525 is further configured to transmit an updated behavioral model to one or more of the set of scoring engines 520 when changes to one or more of the analytic workflows exceeds a threshold. In some examples, the events include at least one of data about network flows, data about packets, data about entities, data about users, data about workstations 565 and servers, data about routers and switches, data about external network entities, and data about internal and external devices 575 interacting with the network.

In some examples, the real time analytic engine 525 is integrated with one or more of the set of scoring engines 520. In some examples, the mitigation action includes at least one of closing at least one port, modifying of at least one packet data, controlling the transmission of packets or flows, blocking a subnet, blocking one or more Internet Protocols (IPs) or ranges of IPs, and blocking one or more internal or external IPs.

In some examples, the mitigation action includes at least one of taking at least one of a server and workstation offline; creating at least one of a new virtualized server and new virtualized workstation from a protected image; and blocking an action associated with at least one of the server and the workstation.

In some examples, the action includes anomalous activity including at least one of a reconnaissance, exploit, intrusion, compromise, insider threat, and attack. In some examples, the mitigation action includes at least one of modifying of at least one packet data, controlling the transmission of packets or flows, and removing authorization and access privileges for an entity associated with the anomalous activity, where removing authorization and access privileges includes at least one of blocking network access, blocking access to network devices, blocking access to servers, blocking access to workstations 565, and blocking access to other computing devices.

In some examples, the anomalous activity is associated with at least one of an internal bad actor and an external bad actor. In some examples, the cybersecurity system is configured to exchange an external threat intelligence message with a compatible third party system, where the external threat intelligence message is encrypted to provide a secure mechanism for transferring information. In some examples, the information in the external threat intelligence message does not expose sensitive internal information about the system transmitting the external threat intelligence message. In some examples, the external threat intelligence message is formatted with a common Model Interchange Format. In some examples, the broadcast message includes at least one of an information message, a cyber event message and an alert message.

According to some embodiments, real time analytic engine 525 is configured to receive the analytic workflows from the distributed analytic platform 515, receive analytic workflow and event processing rules, correlate the network events and the scoring engine messages; and identify at least one of the network events as suspicious in response to the network events and the scoring engine messages having been correlated.

In some examples, the real time analytic engine 525 is further configured to receive the scoring engine messages, receive the distributed analytic platform messages from the distributed analytic platform 515, and process the scoring engine messages and the distributed analytic platform messages using the analytic workflows from the distributed analytic platform 515 and the analytic workflow and event processing rules to form a threat intelligence message. In some examples, the threat intelligence message includes a broadcast message, and the real time analytic engine 525 is configured to transmit the broadcast message. In some examples, the threat intelligence message includes a mitigation message, and the real time analytic engine 525 is configured to transmit the mitigation message to a control plane engine 540 for taking a mitigation action associated with a first logical segment of the one or more logical segments when the processing by the real time analytic engine 525 indicates the mitigation action limits an impact of anomalous activity.

In some examples, the threat intelligence message includes a model update message, and the real time analytic engine 525 is configured to transmit the model update message for updating one or more analytic workflows when the processing by the real time analytic engine 525 indicates the model update message improves at least one of a detection rate of and a reduction in a false positive rate.

In one embodiment, real time analytic engine 525 includes virtual defense module (VDM) 530. According to some embodiments, visualization engine 535 is including a monitor, wherein the visualization engine 535 is configured to receive statistics and graphical images associated with the processing of scoring engine messages by the real time analytic engine 525 and display the statistics and graphical images on the monitor. In one embodiment, control plane engine 540 includes DDI module 545.

In some embodiments, aspects of the distributed analytic platform 515 and related elements and steps, or aspects or portions thereof, may be as shown and described in U.S. Pat. No. 9,306,965, the entirety of which is hereby incorporated by reference.

Figure 6:
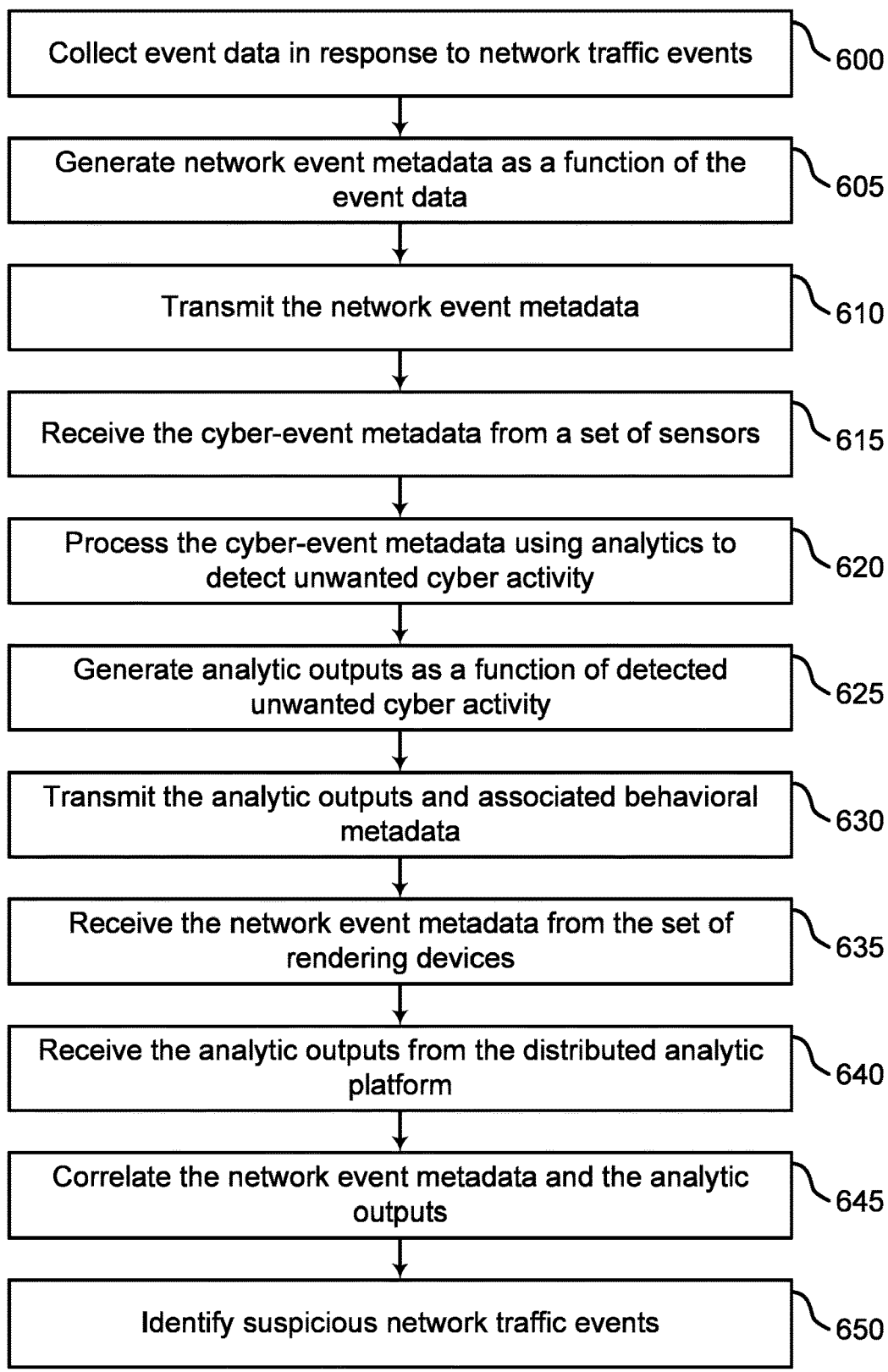
FIG. 6 shows an example of a process for processing events to identify invalid ad traffic according to aspects of the present disclosure.

FIG. 6 shows an example of a process for processing events to identify invalid ad traffic according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system collects event data in response to network traffic events. In some cases, the operations of this step refer to, or may be performed by, rendering devices as described with reference to FIG. 1.

At operation 605, the system generates network event metadata as a function of the event data. In some cases, the operations of this step refer to, or may be performed by, rendering devices as described with reference to FIG. 1.

At operation 610, the system transmits the network event metadata. In some cases, the operations of this step refer to, or may be performed by, rendering devices as described with reference to FIG. 1.

At operation 615, the system receives the cyber-event metadata from a set of sensors. In some cases, the operations of this step refer to, or may be performed by, a distributed analytic platform as described with reference to FIGS. 1 and 5.

At operation 620, the system processes the cyber-event metadata using analytics to detect unwanted cyber activity. In some cases, the operations of this step refer to, or may be performed by, a distributed analytic platform as described with reference to FIGS. 1 and 5.

At operation 625, the system generates analytic outputs as a function of detected unwanted cyber activity. In some cases, the operations of this step refer to, or may be performed by, a distributed analytic platform as described with reference to FIGS. 1 and 5.

At operation 630, the system transmits the analytic outputs and associated behavioral metadata. In some cases, the operations of this step refer to, or may be performed by, a distributed analytic platform as described with reference to FIGS. 1 and 5.

At operation 635, the system receives the network event metadata from the set of rendering devices. In some cases, the operations of this step refer to, or may be performed by, an analytic engine as described with reference to FIGS. 1, 2, and 4.

At operation 640, the system receives the analytic outputs from the distributed analytic platform. In some cases, the operations of this step refer to, or may be performed by, an analytic engine as described with reference to FIGS. 1, 2, and 4.

At operation 645, the system correlates the network event metadata and the analytic outputs. In some cases, the operations of this step refer to, or may be performed by, an analytic engine as described with reference to FIGS. 1, 2, and 4.

At operation 650, the system identifies at least one of the network traffic events as suspicious in response to the network event metadata and the analytic outputs having been correlated. In some cases, the operations of this step refer to, or may be performed by, an analytic engine as described with reference to FIGS. 1, 2, and 4.

Accordingly, the present disclosure includes the following embodiments.

An apparatus for processing events to identify invalid ad traffic is described. One or more embodiments of the apparatus include a plurality of rendering devices configured to collect event data in response to network traffic events, generate network event metadata as a function of the event data, and transmit the network event metadata, a distributed analytic platform configured to receive the cyber-event metadata from a plurality of sensors, process the cyber-event metadata using analytics to detect unwanted cyber activity, generate analytic outputs as a function of detected unwanted cyber activity, and transmit the analytic outputs and associated behavioral metadata, and an analytic engine configured to receive the network event metadata from the plurality of rendering devices, receive the analytic outputs from the distributed analytic platform, correlate the network event metadata and the analytic outputs, and identify at least one of the network traffic events as suspicious in response to the network event metadata and the analytic outputs having been correlated.

A system for processing events to identify invalid ad traffic, the system comprising: a plurality of rendering devices configured to collect event data in response to network traffic events, generate network event metadata as a function of the event data, and transmit the network event metadata, a distributed analytic platform configured to receive the cyber-event metadata from a plurality of sensors, process the cyber-event metadata using analytics to detect unwanted cyber activity, generate analytic outputs as a function of detected unwanted cyber activity, and transmit the analytic outputs and associated behavioral metadata, and an analytic engine configured to receive the network event metadata from the plurality of rendering devices, receive the analytic outputs from the distributed analytic platform, correlate the network event metadata and the analytic outputs, and identify at least one of the network traffic events as suspicious in response to the network event metadata and the analytic outputs having been correlated.

A method of manufacturing an apparatus for processing events to identify invalid ad traffic is described. The method includes a plurality of rendering devices configured to collect event data in response to network traffic events, generate network event metadata as a function of the event data, and transmit the network event metadata, a distributed analytic platform configured to receive the cyber-event metadata from a plurality of sensors, process the cyber-event metadata using analytics to detect unwanted cyber activity, generate analytic outputs as a function of detected unwanted cyber activity, and transmit the analytic outputs and associated behavioral metadata, and an analytic engine configured to receive the network event metadata from the plurality of rendering devices, receive the analytic outputs from the distributed analytic platform, correlate the network event metadata and the analytic outputs, and identify at least one of the network traffic events as suspicious in response to the network event metadata and the analytic outputs having been correlated.

A method of using an apparatus for processing events to identify invalid ad traffic is described. The method includes a plurality of rendering devices configured to collect event data in response to network traffic events, generate network event metadata as a function of the event data, and transmit the network event metadata, a distributed analytic platform configured to receive the cyber-event metadata from a plurality of sensors, process the cyber-event metadata using analytics to detect unwanted cyber activity, generate analytic outputs as a function of detected unwanted cyber activity, and transmit the analytic outputs and associated behavioral metadata, and an analytic engine configured to receive the network event metadata from the plurality of rendering devices, receive the analytic outputs from the distributed analytic platform, correlate the network event metadata and the analytic outputs, and identify at least one of the network traffic events as suspicious in response to the network event metadata and the analytic outputs having been correlated.

Some examples of the apparatus, system, and method described above further include a plurality of sensors, wherein each sensor of the plurality of sensors is coupled to at least one of the plurality of rendering devices, and wherein each sensor of the plurality of sensors is configured to detect cyber events and generate the cyber-event metadata in response to the cyber events.

In some examples, each sensor of the plurality of sensors is coupled to the distributed analytic platform via a network and is configured to receive sensor data from at least one of the plurality of rendering devices, process the sensor data to form the cyber-event metadata, and transmit the cyber-event metadata to the distributed analytic platform, and wherein the distributed analytic platform is configured to receive the cyber-event metadata via the plurality of sensors.

In some examples, the distributed analytic platform is configured to receive the cyber-events from the plurality of sensors, process the cyber events to form analytic workflows and distributed analytic platform messages, and transmit the analytic workflows and the distributed analytic platform messages.

In some examples, each of the distributed analytic platform messages is associated with at least one of an alert, an update to a first analytic model, and cyber behavioral information, and wherein each of the analytic workflows is associated with one or more logical segments and includes at least one analytic model.

Some examples of the apparatus, system, and method described above further include a plurality of scoring engines, each of the plurality of scoring engines being configured to receive the analytic workflows from the distributed analytic platform, receive the cyber events from at least one of the plurality of sensors, process the cyber-event metadata using the analytic workflows to produce scoring engine messages, and transmit the scoring engine messages.

Some examples of the apparatus, system, and method described above further include a real time analytic engine configured to receive the analytic workflows from the distributed analytic platform, receive analytic workflow and event processing rules, receive the scoring engine messages from the plurality of scoring engines, receive the distributed analytic platform messages from the distributed analytic platform, and process the scoring engine messages and the distributed analytic platform messages using the analytic workflows from the distributed analytic platform and the analytic workflow and event processing rules. In some examples, each of the one or more logical segments associates at least one of the first analytic model, the second analytic model, a third analytic model, a set of analytic models, and the analytic workflow; one or more sources of inputs about activity within the one or more logical segments; and a set of actions for mitigating an impact of anomalous activity occurring within the one or more logical segments.

In some examples, the plurality of sensors, the plurality of scoring engines, the distributed analytic platform, the real time analytic engine, and a control plane engine are connected using an out of band network.

In some examples, the plurality of sensors, the plurality of scoring engines, the distributed analytic platform, the real time analytic engine, and the control plane engine communicate by sending associated messages over an enterprise system bus.

In some examples, the plurality of sensors, the plurality of scoring engines, the distributed analytic platform, the real time analytic engine, and the control plane engine communicate by sending associated messages over the enterprise system bus.

Some examples of the apparatus, system, and method described above further include an ingest actors module configured to receive third party application data from at least one of a third party application and a third party device and transmit the third party application data for further processing by at least one of the plurality of scoring engines, the distributed analytic platform and the real time analytic engine.

In some examples, the plurality of sensors, the plurality of scoring engines, the distributed analytic platform, the real time analytic engine, a control plane engine, and the ingest actors module are connected using an out of band network.

In some examples, the plurality of sensors, the plurality of scoring engines, the distributed analytic platform, the real time analytic engine, a control plane engine, and the ingest actors module communicate by sending associated messages over an enterprise system bus.

In some examples, the scoring engine is further configured to receive the model update messages and process the update messages concurrently with the processing of the events.

In some examples, to form at least one of a broadcast message, the mitigation message, and the model update message, the real time analytic engine is further configured to receive a first output at a first time from at least one of the plurality of scoring engines, the distributed analytic platform, and the plurality of sensors; retrieve first state information corresponding to the first output; update the first state information with first output data; process the updated first state information by the analytic workflow associated with the real time analytic engine to form processed updated first state information; store the processed updated first state information in the real time analytic engine; receive a second output at a second time from at least one of the plurality of scoring engines, the distributed analytic platform, and the plurality of sensors; retrieve second state information corresponding to the second output; update the second state information with second output data; process the updated second state information by the analytic workflow associated with the real time analytic engine to form processed updated second state information; form at least one of the broadcast message, the mitigation message and the model update message based on the processed updated second state information; and store the processed updated second state information in the real time analytic engine.

In some examples, the real time analytic engine is further configured to receive an interim output at a third time from at least one of the plurality of scoring engines, the distributed analytic platform, and the plurality of sensors, wherein the third time is subsequent to the first time and prior to the second time; retrieve interim state information corresponding to the interim output; update the interim state information with interim output data; process the updated interim state information by the analytic workflow associated with the real time analytic engine to form processed updated interim state information; and store the processed updated interim state information in the real time analytic engine.

In some examples, the analytic workflows comprise a Model Interchange Format document that supports a composition of analytic models; a segmentation of analytic models; an ensemble of analytic models; a composition of analytic models with rules; a composition of analytic models with pre-processing and post-processing stages, wherein the pre-processing and post-processing stages includes data transformations and data aggregations; and the analytic workflows, each of the analytic workflows further comprising compositions of at least one of the analytic models, the rules, the data transformations, the data aggregations, the segmentations, and ensembles.

In some examples, the real time analytic engine is further configured to transmit an updated behavioral model to one or more of the plurality of scoring engines when changes to one or more of the analytic workflows exceeds a threshold.

In some examples, the events comprise at least one of data about network flows, data about packets, data about entities, data about users, data about workstations and servers, data about routers and switches, data about external network entities, and data about internal and external devices interacting with the network.

In some examples, one or more sensors of the plurality of sensors and the plurality of scoring engines are integrated into a single application.

In some examples, the real time analytic engine is integrated with one or more of the plurality of scoring engines.

In some examples, the mitigation action comprises at least one of closing at least one port, modifying of at least one packet data, controlling the transmission of packets or flows, blocking a subnet, blocking one or more Internet Protocols (IPs) or ranges of IPs, and blocking one or more internal or external IPs.

In some examples, the mitigation action comprises at least one of taking at least one of a server and workstation offline; creating at least one of a new virtualized server and new virtualized workstation from a protected image; and blocking an action associated with at least one of the server and the workstation.

In some examples, the action comprises anomalous activity comprising at least one of a reconnaissance, exploit, intrusion, compromise, insider threat, and attack.

In some examples, the mitigation action comprises at least one of modifying of at least one packet data, controlling the transmission of packets or flows, and removing authorization and access privileges for an entity associated with the anomalous activity, wherein removing authorization and access privileges comprises at least one of blocking network access, blocking access to network devices, blocking access to servers, blocking access to workstations, and blocking access to other computing devices.

In some examples, the anomalous activity is associated with at least one of an internal bad actor and an external bad actor.

Some examples of the apparatus, system, and method described above further include a visualization engine including a monitor, wherein the visualization engine is configured to receive statistics and graphical images associated with the processing of scoring engine messages by the real time analytic engine and display the statistics and graphical images on the monitor.

In some examples, the cybersecurity system is configured to exchange an external threat intelligence message with a compatible third party system; the external threat intelligence message is encrypted to provide a secure mechanism for transferring information; the information in the external threat intelligence message does not expose sensitive internal information about the system transmitting the external threat intelligence message; and the external threat intelligence message is formatted with a common Model Interchange Format.

In some examples, the distributed analytic platform is further configured to receive the scoring engine messages and process the scoring engine messages to form threat intelligence messages.

In some examples, the broadcast message comprises at least one of an information message, a cyber event message and an alert message.

In some examples, each of the one or more logical segments is associated with at least one of a division of the network, a division of the traffic on the network, a division of users on the network, a division of devices on the network, a division based upon third party data, and data associated with at least one of the divisions of the network, the traffic on the network, the users on the network, the devices on the network and third party data.

In some examples, at least a first division overlaps with at least a second division.

In some examples, the plurality of sensors, the plurality of scoring engines, the distributed analytic platform, the real time analytic engine, a control plane engine, and the ingest actors module communicate by sending associated messages over an enterprise system bus.

Some examples of the apparatus, system, and method described above further include a cybersecurity network comprises a plurality of cybersecurity systems, each cybersecurity system of the plurality of the cybersecurity systems is configured to exchange a selected threat intelligence message with one or more of the other cybersecurity systems; the selected threat intelligence message is encrypted to provide a secure mechanism for transferring information; and the information in the selected threat intelligence message does not expose sensitive internal information about the transmitting cybersecurity system.

An apparatus for processing events to identify invalid ad traffic is described. One or more embodiments of the apparatus include a plurality of detectors, each detector of the plurality of detectors being configured to receive detector data from a network, process the detector data to form network events, and transmit the network events, a distributed analytic platform configured to receive cyber events from a plurality of sensors and process the cyber events to form analytic workflows and distributed analytic platform messages, a scoring engine configured to receive the analytic workflows from the distributed analytic platform, receive the cyber events from at least one of the plurality of sensors, process the cyber events using the analytic workflows to produce scoring engine messages, and transmit the scoring engine messages, and a real time analytic engine configured to receive the analytic workflows from the distributed analytic platform, receive analytic workflow and event processing rules, correlate the network events and the scoring engine messages; and identify at least one of the network events as suspicious in response to the network events and the scoring engine messages having been correlated.

A system for processing events to identify invalid ad traffic, the system comprising: a plurality of detectors, each detector of the plurality of detectors being configured to receive detector data from a network, process the detector data to form network events, and transmit the network events, a distributed analytic platform configured to receive cyber events from a plurality of sensors and process the cyber events to form analytic workflows and distributed analytic platform messages, a scoring engine configured to receive the analytic workflows from the distributed analytic platform, receive the cyber events from at least one of the plurality of sensors, process the cyber events using the analytic workflows to produce scoring engine messages, and transmit the scoring engine messages, and a real time analytic engine configured to receive the analytic workflows from the distributed analytic platform, receive analytic workflow and event processing rules, correlate the network events and the scoring engine messages; and identify at least one of the network events as suspicious in response to the network events and the scoring engine messages having been correlated.

A method of manufacturing an apparatus for processing events to identify invalid ad traffic is described. The method includes a plurality of detectors, each detector of the plurality of detectors being configured to receive detector data from a network, process the detector data to form network events, and transmit the network events, a distributed analytic platform configured to receive cyber events from a plurality of sensors and process the cyber events to form analytic workflows and distributed analytic platform messages, a scoring engine configured to receive the analytic workflows from the distributed analytic platform, receive the cyber events from at least one of the plurality of sensors, process the cyber events using the analytic workflows to produce scoring engine messages, and transmit the scoring engine messages, and a real time analytic engine configured to receive the analytic workflows from the distributed analytic platform, receive analytic workflow and event processing rules, correlate the network events and the scoring engine messages; and identify at least one of the network events as suspicious in response to the network events and the scoring engine messages having been correlated.

A method of using an apparatus for processing events to identify invalid ad traffic is described. The method includes a plurality of detectors, each detector of the plurality of detectors being configured to receive detector data from a network, process the detector data to form network events, and transmit the network events, a distributed analytic platform configured to receive cyber events from a plurality of sensors and process the cyber events to form analytic workflows and distributed analytic platform messages, a scoring engine configured to receive the analytic workflows from the distributed analytic platform, receive the cyber events from at least one of the plurality of sensors, process the cyber events using the analytic workflows to produce scoring engine messages, and transmit the scoring engine messages, and a real time analytic engine configured to receive the analytic workflows from the distributed analytic platform, receive analytic workflow and event processing rules, correlate the network events and the scoring engine messages; and identify at least one of the network events as suspicious in response to the network events and the scoring engine messages having been correlated.

In some examples, each of the distributed analytic platform messages is associated with at least one of an alert, an update to a first analytic model, and cyber behavioral information.

In some examples, each of the analytic workflows is associated with one or more logical segments and includes at least one analytic model.

In some examples, the real time analytic engine is further configured to receive the scoring engine messages, receive the distributed analytic platform messages from the distributed analytic platform, and process the scoring engine messages and the distributed analytic platform messages using the analytic workflows from the distributed analytic platform and the analytic workflow and event processing rules to form a threat intelligence message.

In some examples, the threat intelligence message comprises a broadcast message, and the real time analytic engine is configured to transmit the broadcast message.

In some examples, the threat intelligence message comprises a mitigation message, and the real time analytic engine is configured to transmit the mitigation message to a control plane engine for taking a mitigation action associated with a first logical segment of the one or more logical segments when the processing by the real time analytic engine indicates the mitigation action limits an impact of anomalous activity.

In some examples, the threat intelligence message comprises a model update message, and the real time analytic engine is configured to transmit the model update message for updating one or more analytic workflows when the processing by the real time analytic engine indicates the model update message improves at least one of a detection rate of and a reduction in a false positive rate.

In some examples, each of the one or more logical segments associates at least one of the first analytic model, the second analytic model, a third analytic model, a set of analytic models, and the analytic workflow, one or more sources of inputs about activity within the logical segment, and a set of actions for mitigating an impact of anomalous activity occurring within the logical segment.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A cybersecurity system for processing events to identify invalid ad traffic, the cybersecurity system comprising:
   a plurality of rendering devices configured to perform the following steps:
     collect event data in response to network traffic events;
     generate network event metadata as a function of the event data; and
     transmit the network event metadata;
   a plurality of sensors, wherein each of said plurality of sensors is coupled to at least one of said plurality of rendering devices, and wherein each of said plurality of sensors is configured to:
     receive sensor data from at least one of the plurality of rendering devices;
     process the sensor data to detect cyber events and generate cyber-event metadata; and
     transmit the cyber-event metadata;
   a distributed analytic platform coupled to each of the plurality of sensors via a network, the distributed analytic platform configured to perform the following steps:
     receive the cyber-event metadata from the plurality of sensors;
     process the cyber-event metadata using analytics to detect unwanted cyber activity;
     generate analytic outputs as a function of detected unwanted cyber activity;

transmit the analytic outputs and associated behavioral metadata;
receive said cyber-events from said plurality of sensors;
process the cyber-events to form analytic workflows and distributed analytic platform messages, each of the distributed analytic platform messages associated with at least one of an alert, an update to a first analytic model, and cyber behavioral information, each of the analytic workflows associated with one or more logical segments, and including at least one analytic model; and
transmit the analytic workflows and the distributed analytic platform messages;
an analytic engine configured to perform the following steps:
receive the network event metadata from the plurality of rendering devices;
receive the analytic outputs from the distributed analytic platform;
correlate the network event metadata and the analytic outputs; and
identify at least one of the network traffic events as suspicious in response to the network event metadata and the analytic outputs having been correlated;
a plurality of scoring engines, each of the plurality of scoring engines configured to:
receive the analytic workflows from the distributed analytic platform,
receive the cyber events from at least one of the plurality of sensors,
process the cyber-event metadata using the analytic workflows to produce scoring engine messages, and
transmit the scoring engine messages;
a real time analytic engine, the real time analytic engine configured to:
receive the analytic workflows from the distributed analytic platform;
receive analytic workflow and event processing rules;
receive the scoring engine messages from the plurality of scoring engines;
receive the distributed analytic platform messages from the distributed analytic platform; and
process the scoring engine messages and the distributed analytic platform messages using the analytic workflows from the distributed analytic platform and the analytic workflow and event processing rules; and
wherein each of the one or more logical segments associate:
at least one of the first analytic model, a second analytic model, a third analytic model, a set of analytic models, and the analytic workflow,
one or more sources of inputs about activity within the one or more logical segments, and
a set of actions for mitigating an impact of anomalous activity occurring within the one or more logical segments;
wherein the analytic workflows comprise a Model Interchange Format document, wherein the Model Interchange Format document supports:
a composition of analytic models;
a segmentation of analytic models;
an ensemble of analytic models;
a composition of analytic models with rules;
a composition of analytic models with pre-processing and post-processing stages, wherein the pre-processing and post-processing stages include data transformations and data aggregations; and
the analytic workflows, each of the analytic workflows further comprising compositions of at least one of the analytic models, the rules, the data transformations, the data aggregations, the segmentations, and ensembles.

2. The cybersecurity system of claim 1, wherein the plurality of sensors, the plurality of scoring engines, the distributed analytic platform, the real time analytic engine, and a control plane engine are connected using an out of band network.

3. The cybersecurity system of claim 2, wherein the plurality of sensors, the plurality of scoring engines, the distributed analytic platform, the real time analytic engine, and the control plane engine communicate by sending associated messages over an enterprise system bus.

4. The cybersecurity system of claim 3, wherein the plurality of sensors, the plurality of scoring engines, the distributed analytic platform, the real time analytic engine, and the control plane engine communicate by sending associated messages over the enterprise system bus.

5. The cybersecurity system of claim 1, further comprising an ingest actors module, the ingest actors module configured to:
receive third party application data from at least one of a third party application and a third party device, and
transmit the third party application data for further processing by at least one of the plurality of scoring engines, the distributed analytic platform and the real time analytic engine.

6. The cybersecurity system of claim 5, wherein the plurality of sensors, the plurality of scoring engines, the distributed analytic platform, the real time analytic engine, a control plane engine, and the ingest actors module are connected using an out of band network.

7. The cybersecurity system of claim 5, wherein the plurality of sensors, the plurality of scoring engines, the distributed analytic platform, the real time analytic engine, a control plane engine, and the ingest actors module communicate by sending associated messages over an enterprise system bus.

8. The cybersecurity system of claim 1, wherein the plurality of scoring engines are further configured to:
receive the distributed analytic platform messages, and
process the distributed analytic platform messages concurrently with the processing of the cyber event metadata.

9. The cybersecurity system of claim 1, wherein to form at least one of a broadcast message, a mitigation message, and a model update message, the real time analytic engine is further configured to:
receive a first output at a first time from at least one of the plurality of scoring engines, the distributed analytic platform, and the plurality of sensors;
retrieve first state information corresponding to the first output;
update the first state information with first output data;
process the updated first state information by the analytic workflow associated with the real time analytic engine to form processed updated first state information;
store the processed updated first state information in the real time analytic engine;
receive a second output at a second time from at least one of the plurality of scoring engines, the distributed analytic platform, and the plurality of sensors;

retrieve second state information corresponding to the second output;
update the second state information with second output data;
process the updated second state information by the analytic workflow associated with the real time analytic engine to form processed updated second state information;
form the at least one of the broadcast message, the mitigation message and the model update message based on the processed updated second state information; and
store the processed updated second state information in the real time analytic engine.

10. The cybersecurity system of claim 9, wherein the real time analytic engine is further configured to:
receive an interim output at a third time from at least one of the plurality of scoring engines, the distributed analytic platform, and the plurality of sensors, wherein the third time is subsequent to the first time and prior to the second time;
retrieve interim state information corresponding to the interim output;
update the interim state information with interim output data;
process the updated interim state information by the analytic workflow associated with the real time analytic engine to form processed updated interim state information; and
store the processed updated interim state information in the real time analytic engine.

11. The cybersecurity system of claim 1, wherein the real time analytic engine is further configured to:
transmit an updated behavioral model to one or more of the plurality of scoring engines when changes to one or more of the analytic workflows exceeds a threshold.

12. The cybersecurity system of claim 1, wherein the events comprise at least one of:
data about network flows, data about packets, data about entities, data about users, data about workstations and servers, data about routers and switches, data about external network entities, and data about internal and external devices interacting with the network.

13. The cybersecurity system of claim 1, wherein one or more of the plurality of sensors and the plurality of scoring engines are integrated into a single application.

14. The cybersecurity system of claim 1, wherein the real time analytic engine is integrated with one or more of the plurality of scoring engines.

15. The cybersecurity system of claim 1, wherein the set of actions for mitigating the impact of anomalous activity occurring within the one or more logical segments comprises at least one of:
closing at least one port,
modifying of at least one packet data,
controlling transmission of packets or flows,
blocking a subnet,
blocking one or more Internet Protocols (IPs) or ranges of IPs, and
blocking one or more internal or external IPs.

16. The cybersecurity system of claim 1, wherein the set of actions for mitigating the impact of anomalous activity occurring within the one or more logical segments comprises at least one of:
taking at least one of a server and workstation offline;
creating at least one of a new virtualized server and new virtualized workstation from a protected image; and
blocking an action associated with at least one of the server and the workstation.

17. The cybersecurity system of claim 1, wherein the anomalous activity occurring within the one or more logical segments comprises anomalous activity comprising at least one of a reconnaissance, exploit, intrusion, compromise, insider threat, and attack.

18. The cybersecurity system of claim 17, wherein the set of actions for mitigating the impact of anomalous activity occurring within the one or more logical segments comprises at least one of:
modifying of at least one packet data,
controlling transmission of packets or flows, and
removing authorization and access privileges for an entity associated with the anomalous activity, wherein removing authorization and access privileges comprises at least one of blocking network access, blocking access to network devices, blocking access to servers, blocking access to workstations, and blocking access to other computing devices.

19. The cybersecurity system of claim 17, wherein the anomalous activity is associated with at least one of an internal bad actor and an external bad actor.

20. The cybersecurity system of claim 1, further comprising a visualization engine, the visualization engine including a monitor, the visualization engine configured to:
receive statistics and graphical images associated with the processing of scoring engine messages by the real time analytic engine; and
display the statistics and graphical images on the monitor.

21. The cybersecurity system of claim 1, wherein the distributed analytic platform is further configured to:
receive the scoring engine messages; and
process the scoring engine messages to form threat intelligence messages.

22. The cybersecurity system of claim 1, wherein a broadcast message comprises at least one of an information message, a cyber event message and an alert message.

23. The cybersecurity system of claim 1, wherein each of the one or more logical segments is associated with at least one of a division of the network, a division of traffic on the network, a division of users on the network, a division of devices on the network, a division based upon third party data, and data associated with at least one of the divisions of the network, the traffic on the network, the users on the network, the devices on the network and third party data.

24. The cybersecurity system of claim 23, wherein at least a first division overlaps with at least a second division.

25. The cybersecurity system of claim 24, wherein the plurality of sensors, the plurality of scoring engines, the distributed analytic platform, the real time analytic engine, a control plane engine, and an ingest actors module communicate by sending associated messages over an enterprise system bus.

26. A cybersecurity system configured to exchange an external threat intelligence message with a compatible third party system,
wherein:
the external threat intelligence message is encrypted to provide a secure mechanism for transferring information;
the information in the external threat intelligence message does not expose sensitive internal information about a system transmitting the external threat intelligence message; and the external threat intelligence message is formatted with a common Model Interchange Format, wherein the common Model Interchange Format supports:
a composition of analytic models;
a segmentation of analytic models;
an ensemble of analytic models;
a composition of analytic models with rules;
a composition of analytic models with pre-processing and post-processing stages, wherein the pre-processing and post-processing stages include data transformations and data aggregations; and
analytic workflows, each of the analytic workflows further comprising compositions of at least one of the analytic models, the rules, the data transformations, the data aggregations, the segmentations, and ensembles,
wherein the cybersecurity system comprises:
a plurality of rendering devices configured to perform the following steps:
collect event data in response to network traffic events;
generate network event metadata as a function of the event data; and
transmit the network event metadata;
a distributed analytic platform, the distributed analytic platform configured to perform the following steps:
receive cyber-event metadata from a plurality of sensors;
process the cyber-event metadata using analytics to detect unwanted cyber activity;
generate analytic outputs as a function of detected unwanted cyber activity;
transmit the analytic outputs and associated behavioral metadata; and
an analytic engine configured to perform the following steps:
receive the network event metadata from the plurality of rendering devices;
receive the analytic outputs from the distributed analytic platform;
correlate the network event metadata and the analytic outputs; and
identify at least one of the network traffic events as suspicious in response to the network event metadata and the analytic outputs having been correlated.

27. The cybersecurity system of claim 26 further comprising:
said plurality of sensors, wherein each of said plurality of sensors is coupled to at least one of said plurality of rendering devices, wherein each of said plurality of sensors is configured to detect cyber events and generate said cyber-event metadata in response to said cyber events.

28. The cybersecurity system of claim 27 further comprising:
said plurality of sensors, wherein each of said plurality of sensors is coupled to said distributed analytic platform via a network, and is configured to:
receive sensor data from at least one of the plurality of rendering devices,
process the sensor data to form said cyber-event metadata, and
transmit the cyber-event metadata to said distributed analytic platform, wherein said distributed analytic platform is configured to receive said cyber-event metadata via said plurality of sensors.

29. The cybersecurity system of claim 28 further comprising:
said distributed analytic platform configured to:
receive said cyber-events from said plurality of sensors;
process the cyber events to form the analytic workflows and distributed analytic platform messages, each of the distributed analytic platform messages associated with at least one of an alert, an update to a first analytic model, and cyber behavioral information, each of the analytic workflows:
associated with one or more logical segments, and including at least one analytic model, and
transmit the analytic workflows and the distributed analytic platform messages.

30. The cybersecurity system of claim 29 further comprising:
a plurality of scoring engines, each of the plurality of scoring engines configured to:
receive the analytic workflows from the distributed analytic platform,
receive the cyber events from at least one of the plurality of sensors,
process the cyber-event metadata using the analytic workflows to produce scoring engine messages, and
transmit the scoring engine messages.

31. The cybersecurity system of claim 30 further comprising:
a real time analytic engine, the real time analytic engine configured to:
receive the analytic workflows from the distributed analytic platform,
receive analytic workflow and event processing rules,
receive the scoring engine messages from the plurality of scoring engines,
receive the distributed analytic platform messages from the distributed analytic platform, and
process the scoring engine messages and the distributed analytic platform messages using the analytic workflows from the distributed analytic platform and the analytic workflow and event processing rules,
each of the one or more logical segments associating:
at least one of the first analytic model, a second analytic model, a third analytic model, a set of analytic models, and the analytic workflow,
one or more sources of inputs about activity within the one or more logical segments, and
a set of actions for mitigating an impact of anomalous activity occurring within the one or more logical segments.

32. The cybersecurity system of claim 31, wherein the set of actions for mitigating the impact of anomalous activity occurring within the one or more logical segments comprises at least one of:
closing at least one port,
modifying of at least one packet data,
controlling transmission of packets or flows,
blocking a subnet,
blocking one or more Internet Protocols (IPs) or ranges of IPs, and
blocking one or more internal or external IPs.

33. The cybersecurity system of claim 31, wherein the set of actions for mitigating the impact of anomalous activity occurring within the one or more logical segments comprises at least one of:
taking at least one of a server and workstation offline;
creating at least one of a new virtualized server and new virtualized workstation from a protected image; and
blocking an action associated with at least one of the server and the workstation.

34. The cybersecurity system of claim 31, wherein the anomalous activity occurring within the one or more logical segments comprises anomalous activity comprising at least one of a reconnaissance, exploit, intrusion, compromise, insider threat, and attack.

35. The cybersecurity system of claim 34, wherein the set of actions for mitigating the impact of anomalous activity occurring within the one or more logical segments comprises at least one of:
modifying of at least one packet data,
controlling transmission of packets or flows, and
removing authorization and access privileges for an entity associated with the anomalous activity, wherein removing authorization and access privileges comprises at least one of blocking network access, blocking access to network devices, blocking access to servers, blocking access to workstations, and blocking access to other computing devices.

36. The cybersecurity system of claim 34, wherein the anomalous activity is associated with at least one of an internal bad actor and an external bad actor.

37. The cybersecurity system of claim 31, further comprising a visualization engine, the visualization engine including a monitor, the visualization engine configured to:
receive statistics and graphical images associated with the processing of scoring engine messages by the real time analytic engine; and
display the statistics and graphical images on the monitor.

38. A cybersecurity network comprising:
a plurality of cybersecurity systems, wherein each of the plurality of cybersecurity systems is configured to exchange a selected threat intelligence message with one or more of other ones of the plurality of cybersecurity systems, and wherein each of the plurality of cybersecurity systems comprises:
a respective plurality of rendering devices configured to:
collect event data in response to network traffic events;
generate network event metadata as a function of the event data; and
transmit the network event metadata;
a respective distributed analytic platform configured to:
receive cyber-event metadata from a plurality of sensors;
process the cyber-event metadata using analytics to detect unwanted cyber activity;
generate analytic outputs as a function of detected unwanted cyber activity;
transmit the analytic outputs and associated behavioral metadata; and
a respective analytic engine configured to:
receive the network event metadata from the respective plurality of rendering devices;
receive the analytic outputs from the respective distributed analytic platform;
correlate the network event metadata and the analytic outputs; and
identify at least one of the network traffic events as suspicious in response to the network event metadata and the analytic outputs having been correlated,
wherein the selected threat intelligence message is encrypted to provide a secure mechanism for transferring information, and wherein the information in the selected threat intelligence message does not expose sensitive internal information about the plurality of cybersecurity systems that transmit the selected threat intelligence message.

* * * * *